United States Patent [19]

Georgopoulos

[11] Patent Number: 5,227,261
[45] Date of Patent: Jul. 13, 1993

[54] CYLINDRICAL ELECTROCHEMICAL CELLS WITH A DIAPHRAGM SEAL

[75] Inventor: Philip Georgopoulos, Westlake, Ohio

[73] Assignee: Eveready Battery Company, Inc., St. Louis, Mo.

[21] Appl. No.: 775,401

[22] Filed: Oct. 15, 1991

[51] Int. Cl.⁵ .................. H01M 2/12; H01M 4/50; H01M 10/26; H01M 4/42

[52] U.S. Cl. .................. 429/56; 429/174; 429/185; 429/206; 429/224; 429/229

[58] Field of Search .......... 429/56, 54, 185, 174, 429/206, 224, 229

[56] References Cited

U.S. PATENT DOCUMENTS

| | | | |
|---|---|---|---|
| 3,219,488 | 11/1965 | Southworth, Jr. | 429/56 |
| 4,075,398 | 2/1978 | Levy | 429/56 |
| 4,476,200 | 10/1984 | Markin et al. | 429/56 |
| 4,774,155 | 9/1988 | Heinz-Werner | 429/56 |

FOREIGN PATENT DOCUMENTS

| | | |
|---|---|---|
| 3-29881 | 6/1991 | Japan. |
| 3-38700 | 6/1991 | Japan. |
| 2218564 | 11/1989 | United Kingdom. |

*Primary Examiner*—John S. Maples
*Attorney, Agent, or Firm*—Robert W. Welsh

[57] ABSTRACT

Electrochemical cells are comprised of a seal member that has a centrally located cylindrical hub joining a base, which base has a ventable diaphragm portion and a nonventable diaphragm portion, which hub has an end extending above the base and an end extending below the base, into which a current collector is inserted in an interference fit with the end extending above the base, which ventable diaphragm portion joins the hub at an interface forming an arc of between about 135 degrees and 250 degrees, and which interface is the thinnest portion of the base.

17 Claims, 2 Drawing Sheets

CYLINDRICAL ELECTROCHEMICAL CELLS WITH A DIAPHRAGM SEAL

This invention relates to cylindrical electrochemical cells sealed with a seal assembly that has a diaphragm portion for venting.

BACKGROUND OF THE INVENTION

Cylindrical electrochemical cells have the active components contained in a container that has an open end. This end is closed with seal assembly that is comprised of a plastic seal member, a cover terminal and a current collector. The terminal contacts one of the cell electrodes via a current collector. The current collector is generally a nail-like piece that passes through the plastic seal to contact either the anode or cathode.

The seal assembly is intended to perform two somewhat conflicting functions. The first function is to seal the cell so the components do not leak out under conditions of normal use and so the components are not contaminated by contact with air and moisture. The second function is to vent the cell when the internal pressure exceeds a predetermined value.

To perform the first function the seal assembly is made of a synthetic material that can act as a barrier to air and moisture and will not corrode from contact with air, moisture and the cell components. The material must also be strong enough to maintain its sealing function after it has been physically abused such as by dropping or exposure to vibration and/or subjected to extreme variations in temperature and/or humidity.

To perform the venting function, a vent means is built into the seal assembly. By designing the cell to vent under abuse conditions, violent rupturing of the cell can be avoided. Some common vent means include an opening sealed with a meltable or blow-out plug and a scored area in the surface of the sealing member. The scored area will provide a thinner and consequently weaker portion of the surface of the seal member to provide the venting function.

Unfortunately, it is difficult to manufacture seals that perform both functions reliably. The typical seal members are made of synthetic materials by molding. During the molding operation, the synthetic materials may not flow properly to fill the mold, and the resultant seal member will not conform to the necessary specifications. One of the most common defects in the seals is known as hub splitting, i.e. cracks or splits are present in the seal where the current collector passes through. This defect can occur if a weak spot is formed in the hub during molding and the nail-like current collector is inserted via an interference fit through the hub. Contacting the seal with a crazing agent, such as potassium hydroxide, increases the stress on the seal's hub thereby increasing the likelihood that a defective hub will eventually split. If this defect is present, the electrolyte, such as KOH, can migrate from the cell's interior through the hub split to the cell's exterior.

A contributing factor to the potential for hub splitting is the design of the venting means in the seal. When the vent means is provided by molding the seal with areas of different thicknesses, the synthetic material must flow from thin to thick areas. However, this flow may not be uniform since the different thicknesses will create high pressure gradients during filling of the mold. These gradients adversely impact the ability of the molten plastic to pack into the mold thereby weakening the mechanical properties of the molded part. Thus, some portions of the seal may cool and cure prematurely resulting in a weak spot.

The design of the vent in the seals may itself lower the reliability of the vent. Many seals are made with a thin ventable portion that has a uniform cross-sectional thickness. When the internal cell pressure increases, the intent is that the thin ventable portion will burst. However, many times the vent will balloon rather than burst. Thus, the pressure is not relieved.

In view of these disadvantages, there is a desire for a seal that can be made without the problems of nonuniform packing of plastic and that will reliably seal the cell under normal conditions and will reliably vent the cell when required.

SUMMARY OF THE INVENTION

This invention is a cylindrical electrochemical cell comprised of an anode, a cathode and an electrolyte contained in a cylindrical container that is closed at one end and open at the other. The open end of the container is sealed with a seal assembly that is comprised of a disc-shaped seal member made from an electrically insulative material and a current collector. The seal member has an outer edge wall connected via a base to a centrally located cylindrical hub that defines an orifice. The hub has a first end extending above the planar surface in a direction away from the cell's interior and a second end extending below the base in a direction into the cell's interior. The orifice defined by the exterior extending end of the hub has a circumference that is less than the circumference of the orifice defined by the interior extending end of the hub. The current collector extends through the orifice defined by the hub in an interference fit with the circumference of the orifice in the exterior extending end of the hub, and it extends into the cell's interior to contact one of the cell's electrodes.

In another aspect, this invention is a cylindrical electrochemical cell comprised of an anode, a cathode and an electrolyte contained in a cylindrical container that is closed at one end and open at the other. The open end of the container is sealed with a seal assembly that is comprised of a disc-shaped seal member made from an electrically insulative material and a current collector. The seal member has an outer edge wall connected via a base to a centrally located cylindrical hub that defines an orifice. The base has a ventable diaphragm portion and a nonventable diaphragm portion that is thicker than the ventable diaphragm portion. The ventable diaphragm portion joins the hub at an interface and becomes gradually thicker in the direction away from the interface toward the outer edge wall so that the ventable diaphragm portion is the thinnest at the interface. A current collector extends through the orifice defined by the hub into the cell's interior to contact one of the cell's electrodes.

In yet another aspect, this invention is a cylindrical electrochemical cell comprised of an anode, a cathode and an electrolyte contained in a cylindrical container that is closed at one end and open at the other. The open end of the container is sealed with a seal assembly that is comprised of a disc-shaped seal member made from an electrically insulative material and a current collector. The seal member has an outer edge wall connected via a base to a centrally located cylindrical hub that defines an orifice. The base has a ventable diaphragm portion and a nonventable diaphragm portion that is thicker than the ventable diaphragm portion. The ventable diaphragm portion joins the hub at an interface, which interface forms an arc such that the physical stresses on the ventable diaphragm due to an increase in the cell's internal pressure are focused at the interface. A current collector extends through the orifice defined by the hub into the cell's interior to contact one of the cell's electrodes.

In still yet another aspect, this invention is a cylindrical electrochemical cell comprised of an anode, a cathode and an electrolyte contained in a cylindrical container that is closed at one end and open at the other. The open end of the container is sealed with a seal assembly that is comprised of a disc-shaped seal member made from an electrically insulative material and a current collector. The seal member has an outer edge wall connected via a base to a centrally located cylindrical hub that defines an orifice. The base has a ventable diaphragm portion and a nonventable diaphragm portion that is thicker than the ventable diaphragm portion. The hub has a first end extending above the base in a direction away from the cell's interior and a second end extending below the base in a direction into the cell's interior. The first extending end of the hub has an outer circumference that is less than the outer circumference of the second extending end of the hub. The diaphragm portion joins the hub at an interface, which interface forms an arc such that the physical stresses on the ventable diaphragm due to an increase in the cell's internal pressure are focused at the interface. The current collector extends through the orifice defined by the hub in an interference fit with the circumference of the orifice in the first end of the hub, and it further extends into the cell's interior to contact one of the cell's electrodes.

The seals useful in the electrochemical cells of this invention are easily made because the synthetic material can readily flow from the outer edge wall, through the nonventable portion and into the hub and ventable diaphragm portion. The seals of this invention also focus the stresses on the ventable diaphragm at the diaphragm to hub interface so that the seals vent reliably. These seals are useful on all types of cylindrical electrochemical cells such as the alkaline cells, carbon-zinc cells, lithium cells and the like.

DETAILED DESCRIPTION OF THE INVENTION

Figure 1:
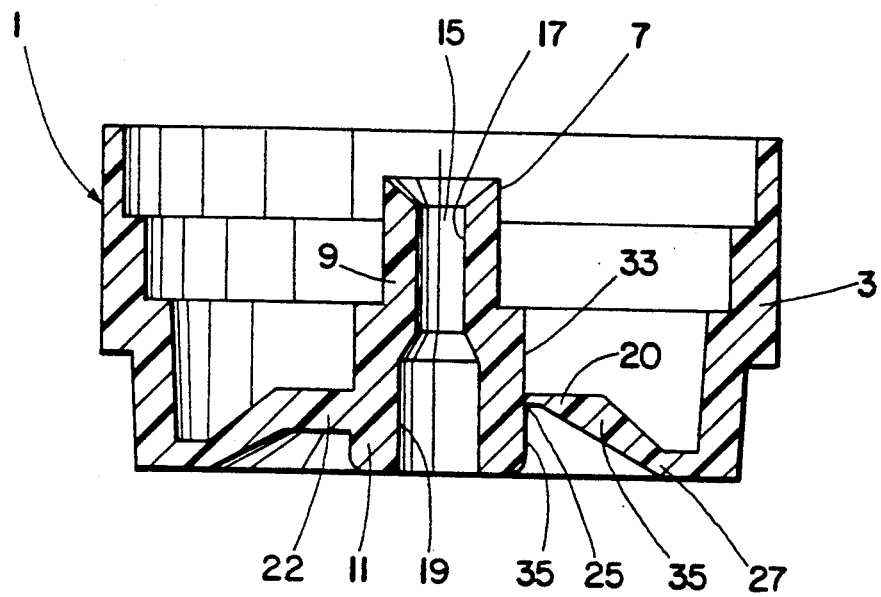
FIG. 1 shows a cross sectional view of the seals useful in this invention.

Referring to FIG. 1, seal member 1 has outer edge wall 3 connected via base 5 to centrally located cylindrical hub 7. Hub 7 has first end 9 extending above base 5 and second end 11 extending below base 5. The hub 7 defines orifice 15. Orifice 15 has a circumference 17 in the first extending end 9 that is less than the circumference 19 in the second extending end 11. Thus, when a current collector is inserted through the orifice, the stress of insertion will be absorbed in the first extending end above the base. The base can be in a variety of shapes. As shown in this FIG. 1, the base 5 has angles and bends. Alternatively, the base could be substantially flat from the outer edge wall to the hub.

Base 5 has ventable diaphragm portion 20 and a nonventable portion 22. The thinnest part of the ventable diaphragm 20 is at the interface 25 of the ventable diaphragm 20 and the hub 7. A hinge 27 is provided by the juncture of the ventable diaphragm 20 and outer edge wall 3. The thickest part 31 of the ventable diaphragm 20 is between the outer edge wall 3 and the hub 7. Thus, when the cell's internal pressure exceeds a predetermined limit, the seal will vent at the ventable diaphragm portion. The stresses on the ventable diaphragm will be focused at the interface of the ventable diaphragm portion and the hub. Since this diaphragm is the thinnest portion of the base, the seal will tear first at the interface. The hinge provided at the juncture of the ventable diaphragm and the outer edge wall facilitates the action of the vent. It is preferred that the outer circumference 33 of the first extending end 9 which is located just above the interface 25 of the diaphragm portion 20 and 22, be less than the outer circumference 35 of the second extending end 11 which is located just below the interface 25 of the diaphragm portions 20, 22. Thus, the edge of the diaphragm will not catch on the first end of the hub during venting of the seal.

Figure 2:
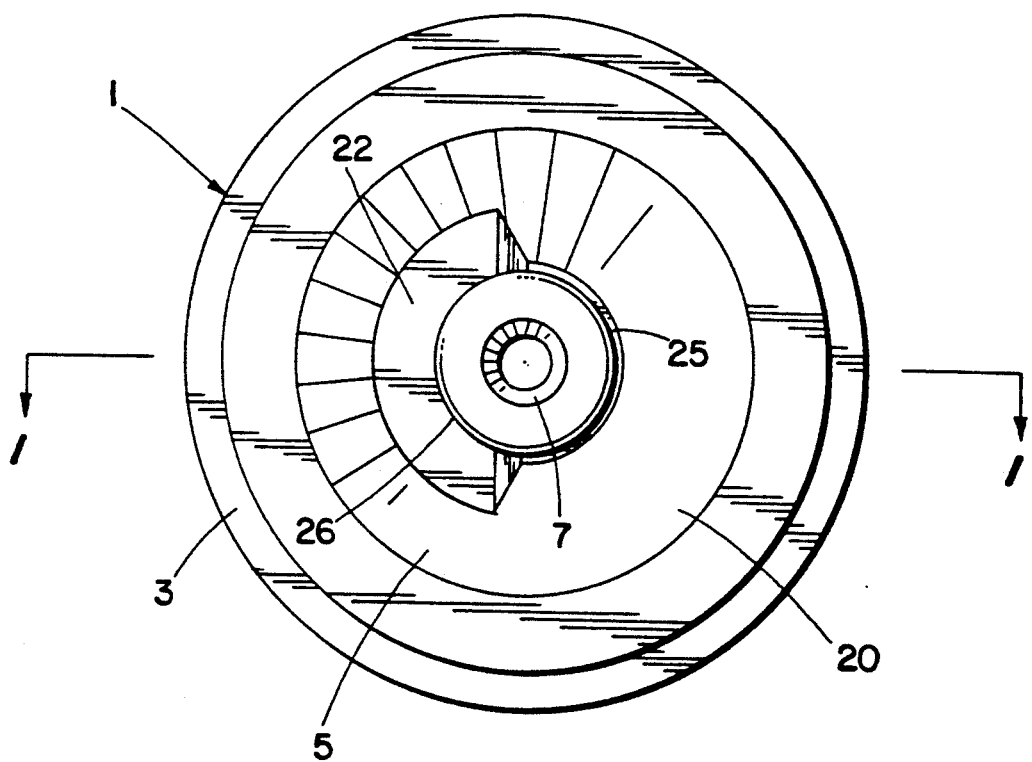
FIG. 2 shows a bottom view of the seals useful in this invention.

Referring to FIG. 2, seal member 1 is shown with outer edge wall 3 connected to hub 7 via base 5. Base 5 has nonventable diaphragm portion 22 and ventable diaphragm portion 20. Ventable diaphragm 20 joins hub 7 at interface 25 and forms an arc. As shown in this FIG. 2, the arc is 180 degrees. The arc can vary so long as the stresses from an increase in internal pressure are focused at the interface 25 of the diaphragm 20 and hub 7. Generally, the more the arc of the interface varies from 180 degrees, the more the stresses are focused away from the interface. The arc can range from about 135 degrees to about 250 degrees, and preferably ranges from about 160 degrees to about 200 degrees, with 180 degrees being most preferred. This arc can also vary according to cell size. For example the larger cell sizes may tolerate a wider variance from 180 degrees than the smaller cell sizes. Thick nonventable portion 22 also joins hub 7 at an interface 26, which forms an arc complimentary to the arc formed by interface 25.

Figure 3:
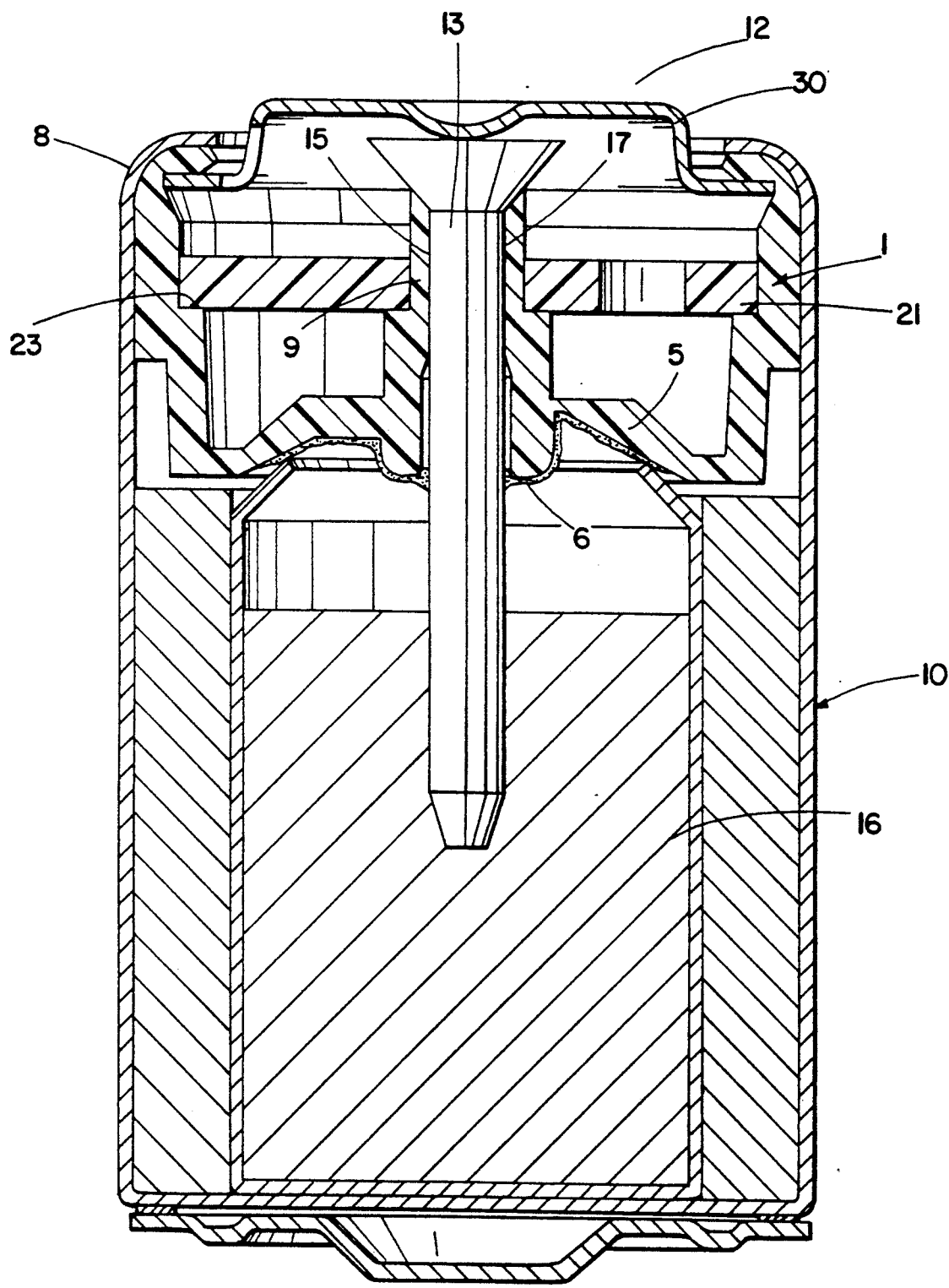
FIG. 3 shows a partial cross sectional view of the open end of an electrochemical cell covered with the seals useful in this invention.

Referring to FIG. 3, electrochemical cell 10 is shown with open end 12 covered with seal member 1. The bottom of the base 5 is coated with an asphalt layer 6 to protect the seal member from crazing by the alkaline electrolyte. The neutral cover 21 is placed onto seal member 1 at ledge 23. Current collector 13 extends through hub 7 of seal member 1 and is in an interference fit with the inside diameter 17 of first extending end 9 of hub 7. Current collector 13 extends to contact anode 16 on the interior of cell 10. Electrolyte 14 forms an integral part of anode 16. Cathode 18 surrounds anode 16 and contacts the interior surface of container wall 8. Terminal cover 30 is placed inside of seal member 1 and is in contact with current collector 13. The cell's container wall 8 is then crimped to provide a hermetic seal.

The seal members of this invention are made of electrically insulative materials that provide a barrier to air and moisture. Examples include any of the engineering moldable plastics such as polyvinyl chloride, polyolefins, nylons, polyesters and the like. A preferred plastic is nylon 6,6 which is available from E. I. DuPont de Demours and Company. The seals are formed by injection molding the plastics into molds of the desired form. The plastics are injected on the side of the mold in order to flow from the outer edge wall, through the nonventable portion of the base, then the ventable portion of the base and into the centrally located hub.

The seals can be used on a variety of electrochemical cell systems. They are primarily intended for use in cells that require sealing from air and moisture and a means for venting pressure built-up. The seals are especially useful in alkaline cells because the alkaline electrolyte, such as KOH, can cause crazing of the seal member. Preferred alkaline cells use an anode comprised of zinc, a cathode comprised of manganese dioxide and an electrolyte of potassium hydroxide. The seals can also be used on a variety of cell sizes.

I claim:

1. A cylindrical electrochemical cell comprising an anode, a cathode and electrolyte contained in a cylindrical container, said container having an open end and a closed end; wherein the open end of said container is sealed with a seal assembly comprising:
   (a) a disc-shaped seal member, made from an electrically insulative material, having an outer edge wall connected via a base to a centrally located cylindrical hub that defines an orifice; which base has a ventable diaphragm portion and a nonventable diaphragm portion that is thicker than the ventable diaphragm portion; and wherein the ventable diaphragm portion joins the hub at an interface and becomes gradually thicker in the direction away from the interface toward the outer edge wall so that the ventable diaphragm portion is thinnest at the interface; and
   (b) a current collector extending through the orifice defined by the hub into the cell's interior to contact one of the cell's electrodes.

2. The electrochemical cell of claim 1, wherein the ventable diaphragm portion of the base joins the outer edge wall via a juncture which provides a hinge for the ventable diaphragm portion during venting.

3. The electrochemical cell of claim 2, wherein the thickest part of the ventable diaphragm portion is located between the hub and the outer edge wall.

4. The electrochemical cell of claim 3, wherein the anode is comprised of zinc, the cathode is comprised of manganese dioxide, and the electrolyte is potassium hydroxide.

5. A cylindrical electrochemical cell comprising an anode, a cathode and electrolyte contained in a cylindrical container, said container having an open end and a closed end; wherein the open end of said container is sealed with a seal assembly comprising:
   (a) a disc-shaped seal member, made from an electrically insulative material, having an outer edge wall connected via a base to a centrally located cylindrical hub that defines an orifice, and which base has a ventable diaphragm portion and a nonventable diaphragm portion that is thicker than the ventable diaphragm portion; and wherein the ventable diaphragm portion joins the hub at an interface, which interface forms an arc between about 135 degrees and about 250 degrees such that the stresses from an increase in internal pressure are focused at the interface; and
   (b) a current collector extending through the orifice defined by the hub into the cell's interior to contact one of the cell's electrodes.

6. The electrochemical cell of claim 5, wherein the nonventable diaphragm portion joins the hub at an interface and forms an arc complementary to the arc formed by the ventable diaphragm portion and hub interface.

7. The electrochemical cell of claim 6, wherein the interface between the ventable diaphragm portion and the hub forms an arc of between about 160 degrees and about 200 degrees.

8. The electrochemical cell of claim 7, wherein the anode is comprised of zinc, the cathode is comprised of manganese dioxide, and the electrolyte is potassium hydroxide.

9. A cylindrical electrochemical cell comprising an anode, a cathode and electrolyte contained in a cylindrical container, said container having an open end and a closed end; wherein the open end of said container is sealed with a seal asembly comprising:
   (a) a disc-shaped seal member, made from an electrically insulative material, having an outer edge wall connected via a base to a centrally located cylindrical hub that defines an orifice, which base has a ventable diaphragm portion and a nonventable diaphragm portion that is thicker than the ventable diaphragm portion; which hub has a first end extending above the base in a direction away from the cell's interior and a second end extending below the base in direction into the cell's interior, and wherein the first extending end of the hub has an outer circumference that is less than the outer circumference of the second extending end of the hub; and wherein the ventable diaphragm portion joins the hub at an interface, which interface forms an arc such that the stresses from an increase in internal pressure are focused at the interface; and
   (b) a current collector extending through the orifice defined by the hub in an interference fit with the circumference of the orifice in the first extending end of the hub, and which current collector extends into the cell's interior to contact one of the cell's electrodes.

10. The electrochemical cell of claim 9, wherein the interface forms an arc of between about 135 degrees and about 250 degrees.

11. The electrochemical cell of claim 10, wherein the interface forms an arc of between about 160 degrees and about 200 degrees.

12. The electrochemical cell of claim 11, wherein the ventable diaphragm portion becomes gradually thicker in the direction away from the interface toward the outer edge wall so that the ventable diaphragm portion is thinnest at the interface.

13. The electrochemical cell of claim 12, wherein the diaphragm portion of the base joins the outer edge wall via a juncture which provides a hinge for the ventable diaphragm portion during venting.

14. The electrochemical cell of claim 13, wherein the thickest part of the ventable diaphragm portion is located between the hub and the outer edge wall.

15. The electrochemical cell of claim 14, wherein the nonventable diaphragm portion joins the hub at an interface and forms an arc complementary to the arc formed by the ventable diaphragm portion and hub interface.

16. The electrochemical cell of claim 15, wherein the interface between the ventable diaphragm portion and the hub forms an arc of about 180 degrees.

17. The electrochemical of claim 16, wherein the anode is comprised of zinc, the cathode is comprised of manganese dioxide, and the electrolyte is potassium hydroxide.

* * * * *